(12) United States Patent
Chaterji et al.

(10) Patent No.: US 12,299,977 B2
(45) Date of Patent: May 13, 2025

(54) SYSTEM AND METHODS FOR CONTENT AND CONTENTION-AWARE APPROXIMATE OBJECT DETECTION

(71) Applicant: Purdue Research Foundation, West Lafayette, IN (US)

(72) Inventors: Somali Chaterji, West Lafayette, IN (US); Saurabh Bagchi, West Lafayette, IN (US); Ran Xu, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 467 days.

(21) Appl. No.: 17/710,233

(22) Filed: Mar. 31, 2022

(65) Prior Publication Data

US 2022/0327826 A1 Oct. 13, 2022

Related U.S. Application Data

(60) Provisional application No. 63/168,393, filed on Mar. 31, 2021.

(51) Int. Cl.
*G06T 7/246* (2017.01)
*G06T 3/40* (2006.01)
(Continued)

(52) U.S. Cl.
CPC .............. *G06V 20/41* (2022.01); *G06T 3/40* (2013.01); *G06T 7/248* (2017.01); *G06T 7/50* (2017.01);
(Continued)

(58) Field of Classification Search
None
See application file for complete search history.

(56) References Cited

U.S. PATENT DOCUMENTS

| | | | | |
|---|---|---|---|---|
| 5,986,575 A | * | 11/1999 | Jones | G08G 1/087 340/988 |
| 10,194,096 B2 | * | 1/2019 | Vuskovic | G06V 20/41 |

(Continued)

OTHER PUBLICATIONS

Apicharttrisorn, K. et al., Frugal following: Power thrifty object detection and tracking for mobile augmented reality. In Proceedings of the Conference on Embedded Networked Sensor Systems (SenSys 2019), Nov. 10-13, 2019, New York, pp. 96-109 (2019).

(Continued)

*Primary Examiner* — Tsung Yin Tsai
(74) *Attorney, Agent, or Firm* — Purdue Research Foundation

(57) ABSTRACT

System and methods for content- and contention-aware object detection are provided. A system may receive video information and perform object detection and object tracking based on an execution configuration. The system may approximate an optimized execution configuration. To approximate the optimized execution configuration, the system may identify, based on the video information, a plurality of content features. The system may further measure a contention level of a computer resource or multiple resources. The system may approximate, based on the content features and the utilization metric, latency metrics, for a plurality of execution configuration sets, respectively. The system may also approximate, based on the content features, accuracy metrics for the execution configuration sets, respectively. The system may select the optimized execution configuration set in response to satisfaction of a performance criterion. The system may perform object detection and object tracking based on the optimized execution configuration set.

18 Claims, 5 Drawing Sheets

(51) Int. Cl.
    *G06T 7/50*     (2017.01)
    *G06V 10/764*     (2022.01)
    *G06V 10/774*     (2022.01)
    *G06V 10/82*     (2022.01)
    *G06V 20/40*     (2022.01)

(52) U.S. Cl.
    CPC ........ *G06V 10/764* (2022.01); *G06V 10/7747* (2022.01); *G06V 10/82* (2022.01); *G06V 20/46* (2022.01); *G06T 2207/10016* (2013.01); *G06T 2207/20081* (2013.01); *G06T 2207/20084* (2013.01)

(56) References Cited

U.S. PATENT DOCUMENTS

| | | | | |
|---|---|---|---|---|
| 10,498,817 | B1* | 12/2019 | Morris | H04L 67/306 |
| 11,204,811 | B2* | 12/2021 | Jain | G06F 9/4856 |
| 2015/0248586 | A1* | 9/2015 | Gaidon | G06V 20/40 382/103 |
| 2020/0311966 | A1* | 10/2020 | Nakata | G06V 10/764 |
| 2021/0243364 | A1* | 8/2021 | Kumar | G06F 9/5044 |
| 2024/0265661 | A1* | 8/2024 | Mclachlan | G06T 7/20 |

OTHER PUBLICATIONS

Chin, T.-W. et al., AdaScale: Towards real-time video object detection using adaptive scaling. In Proceedings of the 2nd Conference on Machine Learning and Systems (SysML), Palo Alto, California, 18 pgs., (2019).
Dai, J. et al., R-FCN: Object detection via region-based fully convolutional networks. In Proceedings of the Advances in Neural Information Processing Systems (NeurIPS), arXiv:1605.06409v2 [cs.CV] Jun. 21, 2016, 11 pgs; (2016).
Elsken, T. et al., Neural Architecture Search: A Survey. Journal of Machine Learning Research 20, 55, pp. 1-21 (2019).
Fang, B. et al., NestDNN: Resource-aware multi-tenant on-device deep learning for continuous mobile vision. In Proceedings of the Annual International Conference on Mobile Computing and Networking (MobiCom '18), Oct. 29-Nov. 2, 2018, New Delhi, India, pp. 115-127 (2018).
Feichtenhofer, C. et al., Detect to track and track to detect. In Proceedings of the 2017 IEEE International Conference on Computer Vision (ICCV). pp. 3057-3065, DOI 10.1109/ICCV.2017.330, (2017).
Fouladi, S. et al., Encoding, Fast and Slow: Low-Latency Video Processing Using Thousands of Tiny Threads. In Proceedings of the 14th USENIX Symposium on Networked Systems Design and Implementation (NSDI '17), Mar. 27-29, 2017, Boston, Massachusetts, pp. 363-376, (2017).
Ghoshal, A. et al., An ensemble SVM model for the accurate prediction of non-canonical microRNA targets. In Proceedings of the 6th ACM Conference on Bioinformatics (BCB '15), Atlanta, Georgia, pp. 403-, Computational Biology and Health Informatics. 403-412, (2015).
Han, S. et al., Deep compression: Compressing deep neural networks with pruning, trained quantization and huffman coding. Conference Paper at ICLR 2016, arXiv:1510.00149v5 [cs.CV] Feb. 15, 2016, pp. 1-14 (2016).
Howard, A. G. et al., MobileNets: Efficient convolutional neural networks for mobile vision applications. arXiv preprint, arXiv:1704.04861v1 [cs.CV] Apr. 17, 2017, 9 pgs., (2017).
Hsieh, K. et al., Focus: Querying large video datasets with low latency and low cost. In the Proceedings of the 13th USENIX Symposium on Operating Systems Design and Implementation (OSDI '18), Oct. 8-10, 2018, Carlsbad, California, pp. 269-286, (2018).
Hu, H. et al., Network trimming: A data-driven neuron pruning approach towards efficient deep architectures. arXiv preprint, arXiv:1607.03250v1 [cs.NE] Jul. 12, 2016, 9 pgs. (2016).
Huang, G. et al., Multi-scale dense networks for resource efficient image classification. In Proceedings of International Conference on Learning Representations (ICLR '18), arXiv:1703.09844v5 [cs.LG] Jun. 7, 2018, 14 pgs. (2018).
Courbariaux, M. et al., Binarized neural networks: Training Deep Neural Networks with Weights and Activations Constrained to + or − 1. In Proceedings of the Advances in Neural Information Processing Systems (NeurIPS). pp. 4107-4115, arXiv:1602.02830v3 [cs.LG] Mar. 17, 2016, (2016).
Hubara, I. et al., Quantized Neural Networks: Training Neural Networks with Low Precision Weights and Activations. Journal of Machine Learning Research 18, 187-1 (2017), arXiv:1609.07061v1 [cs. NE] Sep. 22, 2016, pp. 1-29, (2017).
Iandola, F. N. et al., SqueezeNet: AlexNet-level accuracy with 50x fewer parameters and < 0.5 MB model size. In Proceedings of International Conference on Learning Representations (ICLR '17), pp. 1-13., arXiv:1602.07360v4 [cs.CV] Nov. 4, 2016, (2016).
Jiang, J. et al., Chameleon: scalable adaptation of video analytics. In Proceedings of the Conference of the ACM Special Interest Group on Data Communication (SIGCOMM '18), Aug. 20-25, 2018, Budapest, Hungary, pp. 253-266, (2018).
Kang, K. et al., T-CNN: Tubelets with convolutional neural networks for object detection from videos. IEEE Transactions on Circuits and Systems for Video Technology, 28, 10 (2017), pp. 2896-2907, arXiv:1604.02532v4 [cs. CV] Aug. 3, 2017, (2017).
Li, H. et al., Pruning filters for efficient ConvNets. In Proceedings of International Conference on Learning Representations (ICLR 2017). pp. 1-13, arXiv:1608.08710v3 [cs.CV] Mar. 10, 2017, (2017).
Lin, T.-Y. et al., Focal loss for dense object detection. In Proceedings of the 2017 EEE International Conference on Computer Vision (ICCV '17), pp. 2999-3007, DOI 10.1109/ICCV.2017.324, (2017).
Liu, L. et al., Edge assisted real-time object detection for mobile augmented reality. Conference Paper MobiCom '19, Oct. 21-25, 2019, Los Cabos, Mexico, 16 pgs. (2019).
Liu, W. et al. SSD: Single shot multibox detector. In Proceedings of the European conference on Computer Vision (ECCV), vol. 9907, 21-37, (2016), arXiv:1512.02325v5 [cs.CV] Dec. 29, 2016 (2016).
Luo, J.-H. et al., ThiNet: pruning CNN filters for a thinner net. IEEE Transactions on Pattern Analysis and Machine Intelligence vol. 41, No. 10, Oct. 2019, pp. 2525-2538; published Jul. 19, 2018.
Panta, R. K. et al., Efficient incremental code update for sensor networks. ACM Transactions on Sensor Networks (TOSN) vol. 7, No. 4, Feb. 2011, pp. 1-31, (2011).
Rastegari, M. et al., XNOR-Net: ImageNet classification using binary convolutional neural networks. In Proceedings of the European Conference on Computer Vision (ECCV '16), Part IV, LNCS 9908, pp. 525-542, (2016).
Redmon, J. et al., You only look once: Unified, real-time object detection. In Proceedings of the IEEE Conference on Computer Vision and Pattern Recognition (CVPR), pp. 779-788, arXiv:1506.02640v5 [cs.CV] May 9, 2016, (2016).
Redmon, J. et al., YOLOv3: An incremental improvement. arXiv preprint, arXiv:1804.02767 [cs.CV] Apr. 8, 2018, 6 pgs. (2018).
Ren. S. et al., Faster R-CNN: Towards real-time object detection with region proposal networks. In Proceedings of the Advances in Neural Information Processing Systems (NeurIPS). 91-99, arXiv:1506.01497v3 [cs.CV] Jan. 6, 2016 (2015).
Sandler, M. et al., MobileNetv2: Inverted residuals and linear bottlenecks. In Proceedings of the 2018 IEEE/CVF Conference on Computer Vision and Pattern Recognition (CVPR '18)., pp. 4510-4520, DOI 10.1109/CVPR.2018.00474, (2018).
Shuai, H. et al., Cascaded Regional Spatio-Temporal Feature-Routing Networks for Video Object Detection. IEEE Access 6, pp. 3096-3106, (2018); date of publication Dec. 27, 2017.
Tan, M. et al., MnasNet: Platform-aware neural architecture search for mobile. In Proceedings of the IEEE Conference on Computer Vision and Pattern Recognition (CVPR), pp. 2820-2828, arXiv:1807.11626v3 [cs. CV] May 29, 2019, (2019).
Tan, M. et al., EfficientNet: Rethinking model scaling for convolutional neural networks. In Proceedings of the 36th International Conference on Machine Learning, Long Beach, California, 2019, 10 pgs, arXiv:1905.11946v5 [cs.LG] Sep. 11, 2020.

(56) References Cited

OTHER PUBLICATIONS

Tan, M. et al., EfficientDet: Scalable and efficient object detection. arXiv:1911.09070v7 [cs. CV] Jul. 27, 2020, pp. 1-10 (2020).
Teerapittayanon, S. et al., BranchyNet: Fast inference via early exiting from deep neural networks. In Proceedings of 2016 23rd (IEEE) International Conference on Pattern Recognition (ICPR), Cancún, México, Dec. 4-8, pp. 2464-2469, (2016).
Veit, A. et al., Convolutional networks with adaptive inference graphs. International Journal of Computer Vision, vol. 128 (2020), pp. 730-741; published online Jun. 21, 2019.
Wang, R. J. et al., Pelee: A real-time object detection system on mobile devices. In Proceedings of the Advances in 32nd Conference on Neural Information Processing Systems (NeurIPS 2018), Montréal, Canada, 10 pgs., (2018).
Wu, B. et al., FBNet: Hardware-aware efficient convNet design via differentiable neural architecture search. In Proceedings of the IEEE Conference on Computer Vision and Pattern Recognition (CVPR), pp. 10734-10742, arXiv:1812.03443v3 [cs.CV] May 24, 2019 (2019).
Wu, Z. et al., BlockDrop: Dynamic inference paths in residual networks. In Proceedings of the 2018 IEEE/CVF Conference on Computer Vision and Pattern Recognition (CVPR). pp. 8817-8826, DOI 10.1109/CVPR.2018.00919, (2018).
Xu, R. et al., Pythia: Improving datacenter utilization via precise contention prediction for multiple co-located workloads. In Proceedings of the 19th International Middleware Conference (Middleware '18), Dec. 10-14, 2018, Rennes, France, ACM, pp. 146-160, (2018).
Yang, L. et al., Resolution Adaptive Networks for Efficient Inference. In Proceedings of the 2020 IEEE/CVF Conference on Computer Vision and Pattern Recognition (CVPR), pp. 2366-2375, (2020).
Zhang, H. et al., Live Video Analytics at Scale with Approximation and Delay-Tolerance. In Proceedings of the 14th USENIX Symposium on Networked Systems Design and Implementation (NSDI '17), , Mar. 27-29, 2019, Boston, Massachusetts, vol. 9, pp. 377-392, (2017).
Zhang, X. et al., ShuffleNet: An extremely efficient convolutional neural network for mobile devices. In Proceedings of the 2018 IEEE/CVF Conference on Computer Vision and Pattern Recognition (CVPR '18), pp. 6848-6856, (2018).
Zhu, X. et al., Towards high performance video object detection. In Proceedings of the 2018 IEEE/CVF Conference on Computer Vision and Pattern Recognition (CVPR '18), pp. 7210-7218, (2018).
Zhu, X. et al., Flow-guided feature aggregation for video object detection. In Proceedings of the 2017 IEEE International Conference on Computer Vision (ICCV), pp. 408-417, (2017).
Zilberstein, S. Using anytime algorithms in intelligent systems. AI Magazine, vol. 17, No. 3, Fall 1996, pp. 73-73, (1996).
Xu, R. et al. ApproxDet: Content and contention-aware approximate object detection for mobiles. SenSys '20, Nov. 16-19, 2020, Virtual Event, Japan, ACM, pp. 449-462, (2020); available at https://doi.org/10.1145/3384419.3431159, (2020).

\* cited by examiner

SYSTEM AND METHODS FOR CONTENT AND CONTENTION-AWARE APPROXIMATE OBJECT DETECTION

CROSS REFERENCE TO RELATED APPLICATIONS

This application claims the benefit of U.S. Provisional Application No. 63/168,393 filed Mar. 31, 2021, which is herein incorporated by reference in its entirety.

GOVERNMENT RIGHTS

This invention was made with government support under CCF 1919197 awarded by the National Science Foundation. The government has certain rights in the invention.

TECHNICAL FIELD

This disclosure relates to computer vision and, in particular, to machine learning and resource contention management.

STATEMENT REGARDING PRIOR DISCLOSURES BY THE INVENTORS OR JOINT INVENTORS UNDER 37 C.F.R. 1.77(B)(6)

The joint inventors of the present disclosure, Somali Chaterji, Saurabh Bagchi, and Ran Xu, publicly disclosed information related to the present disclosure in article "ApproxDet: content and contention-aware approximate object detection for mobiles." In Proceedings of the 18th Conference on Embedded Networked Sensor Systems, pp. 449-462. 2020. (Appeared in ACM-SenSys 2020). The article was published on Nov. 16, 2020, which is less than one year prior to the filing date of the U.S. Provisional Application Ser. No. 63/168,393, filed Mar. 31, 2021. A copy the article will be provided an Information Disclosure Statement (IDS).

BACKGROUND

Mobile devices with integrated cameras have seen tremendous success in various domains. Equipped with increasingly powerful System-on-Chips (SoCs), mobile augmented reality (AR) devices such as the Microsoft Hololens and Magic Leap One, along with next generation mobile devices, are opening up a plethora of new continuous mobile vision applications that were previously deemed impossible. These applications range from detection of objects around the environment for immersive experience in AR games such as Pokemon-Go, to recognition of road signs for providing directions in real-time, to identification of people for interactive photo editing, and to Manchester City's AR-driven stadium tour. A fundamental vision task that all of these applications must perform, is object detection on the live video stream that the camera is capturing. To maintain the immersive experience of the user (e.g., for AR games) or to give usable output on time (e.g., for road sign recognition), such tasks should be performed in near real-time with very low latency.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
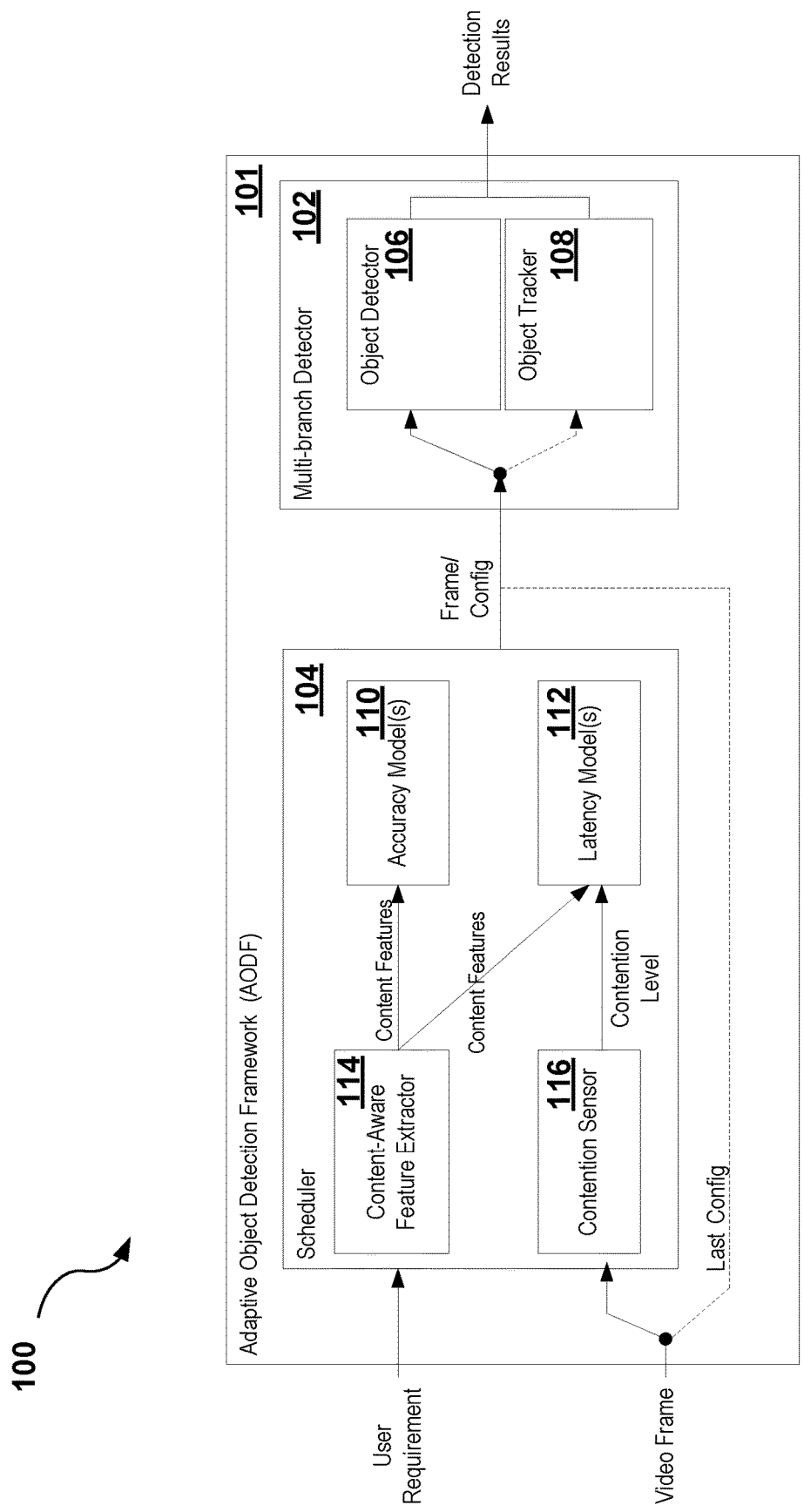
FIG. 1 illustrates a first example of a system.

Computer vision and computer systems research working together has made significant progress in lightweight object detection applicable to mobile settings for still images in recent years, thanks to development of efficient deep neural networks (DNNs). However, directly applying image-based object detectors to video streams suffers, especially in mobile settings. First, applying a detector on all video frames introduces excessive computational cost and would often violate the latency requirements of our target continuous vision applications. Second, image-based object detectors are not cognizant of the significant temporal continuity that exists in successive video frames (e.g., a static scene with a slowly moving object), unable to map this to the latency budget. To overcome these algorithmic challenges, the computer vision community has proposed some DNN models for video object detection and tracking.

Despite these efforts, challenges of video object detection (both 2D and 3D) for continuous vision applications on resource constrained devices remain largely unsolved. A major shortcoming is that none of the existing approaches can adapt to runtime condition changes, such as the content characteristics of the input videos, and the level of contention on the edge device. Modern mobile devices come with increasingly powerful System-on-Chips (SoCs) having multiple heterogeneous processing units, and no longer process just a single application at a time. For example, both iOS and Android support multiple background tasks, such as an always-on personal assistant, e.g., Siri running a DNN for speech recognition (GPU contention), or a firewall constantly inspecting packets (memory-bandwidth contention). These tasks can run simultaneously with a continuous vision application that requires a video object detector, leading to unpredictable resource contention on mobile devices similar to a traditional server setting.

Such concurrent applications or background tasks can compete with object detection, drastically increasing the object detector's latency. Consider the example of a widely used DNN-based object detector: Faster R-CNN (FRCNN), integrated with MedianFlow (MF) object tracking and optimized for may have a latency requirement of 100 milliseconds (ms)[2]. Without contention, the detector has a latency of ≈64 ms. However, as the GPU contention level increases a drastic increase in detection latency follows. While the accuracy remains the same, the latency of the detector fluctuates significantly and violates the latency requirement. Different from server-class devices, mobile devices may have limited ability to isolate co-located applications from interference, stemming from the paucity of VM-like isolation mechanisms.

To address these and other technical issues, the system and methods described herein are provided. In various examples, the system takes both video content-awareness and resource contention awareness within its ambit. In contrast to the static FRCNN+MF, the system manages to keep a latency below the requirement with increased level of contention while achieving a better accuracy. To this end, the system may use a model with multiple approximation parameters that are dynamically tuned at runtime to stay on the Pareto optimal frontier (of the latency-accuracy curve in this case). We refer to the execution branch with a particular configuration set an approximation branch (AB).

The system and methods described herein offer various technical advantages. First, the systems and methods herein model the impacts of the contention level to the latency of the ABs. Second, the system and methods described herein combine an offline trained latency prediction model and an online contention sensor to precisely predict the latency of each AB in our system. Thus, the system and methods described herein can adapt to resource contention at a given latency budget at runtime, an ability especially critical for the deployment on edge devices as their resources are limited and shared. Third, the system and methods described herein further consider how the video content influences both accuracy and latency. The system and methods described herein leverages video characteristics such as the object motion (fast vs. slow) and the sizes and the number of objects, to better predict the accuracy and latency of the ABs, and to select the best AB with reduced latency and increased accuracy. Additional benefits, efficiencies, and improvements over existing market solutions are made evident in the systems and methods described herein.

FIG. 1 illustrates a first example of a system 100. The system 100 may include an adaptive object detection framework (AODF) 101. The AODF may include a scheduler 102 and a multibranch object detection framework 104. The multi-branch detector 104 may receive a video information, such as a video frame, and an execution configuration as an input. The scheduler 104 may govern which configuration the detection framework should utilize to perform the detection.

The multi-branch detector 102 may include an object detector 106 and an object tracker 108, which allows both object tracking and detection. This follows the practice for video object detection that combines the heavy-weight detection and the light-weight tracker. The multi-branch detector may receive configuration parameters which govern operation of the multi-branch detector and associated object detection and object tracking, whether 2D or 3D. Thus, the configuration parameters may be regarded as tuning parameters which can be modified to adjust performance of object tracking/detection. The system and methods described herein can also be applied to object classification, which is a simpler computer vision task than object detection.

The schedule 104 may tune the execution configuration of the multi-branch detector based on the features derived from the video and computer resource contention. The execution configuration may be tunable within a dynamic range. Accordingly, a multi-dimensional configuration space can be created resulting in multiple possible ABs. The accuracy and the latency (execution time) are different for each AB and the values depend upon the video content characteristics (e.g., still versus fast-moving) and the compute resources available (e.g., lightly-loaded versus heavily-loaded mobile). To efficiently select an AB at runtime according to the given (and possibly changing) user requirement, the scheduler estimates the current latency and accuracy of each branch. The scheduler then selects the most accurate/fastest branch according to the specified performance criterion.

The scheduler may run occasionally, periodically, or a according to a rule to re-calibrate the best approximation branch and determine the respective configuration for the multi-branch detector. In some examples, the schedule may establish a new approximation branch (and thus a new configuration) based on a learnable interval called "scheduler interval". The scheduler interval may be value which triggers the scheduler to run. In some examples, the scheduler interval can be a time or number of frames that the configuration of the detection framework can be maintained.

Multi-Branch Object Detection Framework

Figure 2:
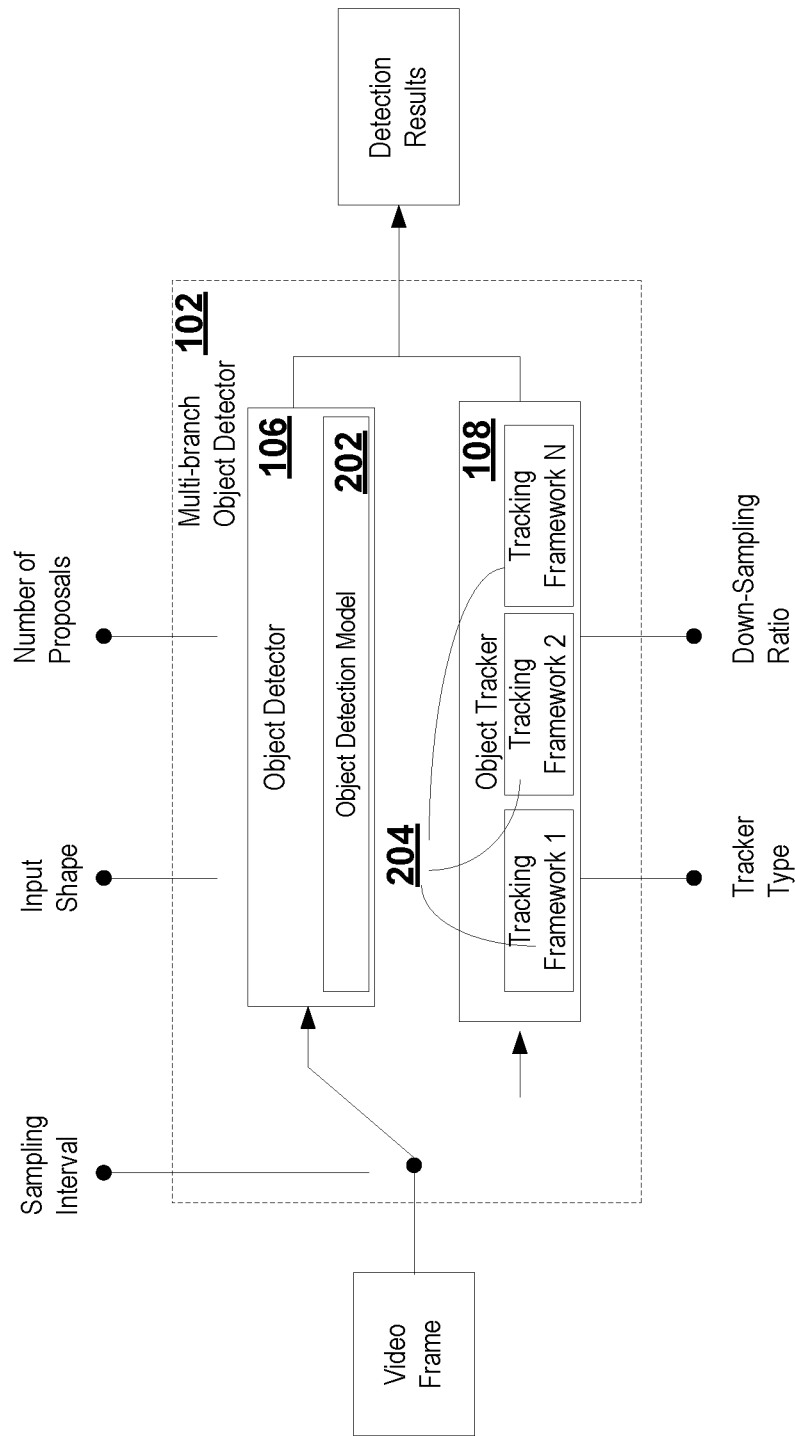
FIG. 2 illustrates an example of a multi-branch object detector.

FIG. 2 illustrate an example of a multi-branch object detector 102. The object detector may perform object detection based on an object detection model. For example, the object detection model may include, for example, a deep neural network (DNN). There are various non-limiting examples of DNN's for the object detection are described below.

Given an input image or video frame, object detector aims at locating tight bounding boxes of object instances from target categories. In terms of network architecture, a CNN-based object detector can be divided into the backbone part that extracts image features, and the detection part that classifies object regions based on the extracted features. The detection part can be further divided into two-stage and single-stage detectors. Two-stage detectors usually make use of Region Proposal Networks (RPN) for generating regions-of-interest (RoIs), which are further refined through the detection head and thus more accurate.

The overwhelming majority of work on lightweight object detection is for images, e.g., YOLOv3 and SSD, thus being agnostic to video characteristics inherent to the temporal relation between image frames. In some preferred examples, the detection DNN may include the Faster-RCNN with ResNet-50 as the backbone. Faster-RCNN is an accurate and flexible framework for object detection and a canonical example of a two-stage object detector. An input image or video frame is first resized to a specific input shape and fed into a DNN, where image features are extracted. Based on the features, a RPN identifies a pre-defined number of candidate object regions, known as region proposals. Image features are further aggregated within the proposed regions, followed by another DNN to classify the proposals into either background or one of target object categories and to refine the location of the proposals. Our key observation is that the input shape and the number of proposals have significant impact to the accuracy and latency. Therefore, we propose to expose input shape and number of region proposals as tuning parameters.

Alternative or in addition, the object detector may perform single-stage object detection. Without using region proposals, these models are optimized for efficiency and oftentimes less flexible. Examples of single stage object detection may include YOLO. Single-stage object detection may simplify object detection as a regression problem by directly predicting bounding boxes and class probabilities without the generation of region proposals.

Object tracking is the other aspect of the multi-branch detector. The object tracker 108 may locate moving objects over time within a video. The object tracker, as described herein may focus on motion-based visual tracking due to its simplicity and efficiency. In some examples, the object tracker may assume the initial position of each object is given in a starting frame, and makes use of local motion cues to predict the object's position in the next batch of frames.

The object tracker may access one or more object tracking frameworks 204 which perform object tracking with various degrees of accuracy and efficiency with a given set in of input data. The object tracking frameworks 204 may include model(s) and/or logic for performing object tracking. For example, the object tracking frameworks may include a set of existing motion-based object trackers, such as Median-Flow, KCF, CSRT, Dense Optical Flow and/or any other suitable trackers. A key difference behind various object trackers lies in the extraction of motion cues, via e.g., optical flow or correlation filters, leading to varying accuracy and efficiency under different application scenarios. Accordingly, the multi-branch object detector may enable the adaptive choice of the trackers as one of the tuning variables described herein.

Another important factor of object tracking performance is the input resolution to a motion-based tracker. A down sampled version of the input image allows improves capturing of large motion and thus tracking fast-moving objects, while a high-resolution input image facilitates the accurate tracking of objects that move slowly. Therefore, the multi-branch object detector 102 may receive the down sampling ratio of the input image as another tuning parameter for tracking.

Accordingly, to support the runtime adaptive object detection framework on videos, the multibranch object detector 102 may operate with light switching overheads among branches for mapping to runtime changes. Different from object detection on still images, videos have temporal similarities and an object tracker is used to reduce the runtime cost with minor accuracy drop.

The object detector may perform object detection in a sampling interval while the tracker may track objects between successive frames in the sampling interval. In other words, the object detector may perform computer vision tasks such as object classification, object localization, object detection (in some ways, together these three are within the ambit of object recognition), activity recognition, etc. Essentially, object detection does object classification and then ALSO, in some examples, may define a bounding box around each object of interest in the image and then assigns a class label to each object with a certain probability. Alternatively or in addition, the object detector may perform vanilla object detection and video object detection. An advantage afforded by the system described is that one can leverage the temporal continuity of frames in a group-of-frames (GoF) within a time window in a continuous video and remove redundant steps. For example, some frames may be repetitive and detection may be suspended and, instead, only lightweight tracking may be performed. In fact, this window is something we can learn from the characteristics of the video or may include a fixed window, such as 8 frames. Accordingly, the system may perform compute-intensive object detection for the first frame and object "tracking" (essentially following the detected objects) for the rest of the window (i.e. 7 frames). This is essentially the Sampling interval (si) tuning parameter in our algorithm, also listed in Table 1 below.

Non-liming examples of the tuning parameters described herein include those listed in Table 1, though other parameters are possible.

TABLE 1

Tuning Parameter Examples

| Tuning Parameter | Summary Description |
|---|---|
| Sampling interval (si) | For every frame, we run the heavy weight object detection DNN on the n frame(s) and light-weight object tracker on the rest of the frames. |
| Input shape (shape) | The resized shape of the video frame that is fed into the detection DNN. |

TABLE 1-continued

Tuning Parameter Examples

| Tuning Parameter | Summary Description |
|---|---|
| Number of proposals (nprop) | The number of proposals generated from the Region Proposal Networks (RPN) in our detection DNN. |
| Tracker type (tracker) | Type or identifier of object tracker. |
| Down-sampling ratio (ds) | The downsampling ratio of the frameused by the object tracker. |

Generally, it was empirically observed through various experimentation that smaller si, larger shape, more nprop, and smaller ds will raise the accuracy and vice versa.

Scheduler

Referring back to FIG. 1, a deeper discussion of the scheduler follows. The scheduler 104 may perform the decision-making at runtime on which AB (aka execution configuration set) should be used to run the inference on the input video frames. Formally, the scheduler 104 maximizes the estimated detection accuracy of the system given a latency requirement $L_{req}$. This is done by identifying a feasible set of branches that satisfy the target latency requirements, and choosing the most accurate branch. In case of an empty feasible set, the fastest branch is returned. Thus, we formulate the optimal AB $b_{opt}$ as follows, $$b_{opt} = \begin{cases} \text{argmax}_{b \in \hat{B}}(A_b), & \text{if } \hat{B} \neq \emptyset, \\ \text{argmin}_{b \in \hat{\beta}}(L_{est,b}) & \text{otherwise} \end{cases}$$

where $\hat{\beta}$ is all ABs considered, $\hat{B}$ is the feasible set, i.e., $\hat{B}=\{b \in \hat{\beta}\}$ if $L_{est,b} < L_{req}$, $A_b$ and $L_{est,b}$ are the estimated accuracy and latency of the AB respectively. The search space $\hat{\beta}$, which includes five orthogonal knobs, has millions of states.

To further reduce the scheduler overhead and enhance our system robustness, the scheduler may make a decision every sw frames. The motivation of introducing sw is to prevent the scheduler to make very frequent decisions. When sw=max (8, si), the schedulers make a decision at least every 8 frames. When the scheduler chooses a branch with a long si, it will make a following decision every si frames. In addition to the latency of the detection and tracking kernels, switching overhead $L_{sw}$ and the scheduler overhead $L_{sc}$ may be included in the overall latency estimation of an AB b, i.e., $L_{est,b}=L_{b,fr}+(L_{sw}+L_{sc})/sw$. The light-weight online feature extractors may be designed so that they can adapt seamlessly to the content and contention changes.

The scheduler may include a content-aware feature extractor 102 and a contention sensor 116. The content-aware may extract features from the video information. The features may include, for example, height, width, tracking of the object information of the last frame(s), and calculates the object movements of the past few frames The contention sensor may detect resource contention level(s). The accuracy model and a latency model may be trained offline to support such estimation during runtime based on the contention level and/or content features.

Configuration of the Tuning Parameters

As previously discussed, the tuning parameters may include the sampling interval (si), the input image size (shape) to the detection DNN, the number of proposals (nprop) in the detection DNN, the type of object tracker (tracker) and the downsampling ratio of the input to the tracker (ds). We now describe the implementation details of these parameters, including example data types and example value ranges.

Sampling Interval (si). si defines the interval of running the object detector. The object tracker runs on the following (si−1) frames. For example, our system runs object detection on every frame when si=1. To reduce the search space of si, we constrain si in a preset set—{1, 2, 4, 8, 20, 50, 100}. These pre-defined si are chosen empirically to cover common video object detection scenarios. With the max value of si=100, the detector runs at a large interval of 3-4 seconds and the tracker runs in-between.

Input Video Frame Shape to Detector (shape). The shape defines the shortest side of the input video frame to the object detector. The value of shape must be a multiple of 16 to make the precise alignment of the image pixels and the feature map. We set the shape range from 224 to 576, since smaller shape than 224 significantly reduces the accuracy and larger shape than 576 will result in heavy computational burden and does not improve the accuracy based on results on the validation set.

Number of Proposals (nprop). The nprop controls the number of candidate regions considered for classification in the object detector. We limit the value of nprop (integer) between 1 and 100. With nprop=1, only the top ranked proposal from RPN is used for detection. Increasing nprop will boost the detector's performance yet with increased computational cost and runtime.

Type of Trackers (tracker). The tracker defines which tracker to use from MedianFlow, KCF, CSRT, and dense optical flow trackers. These trackers are selected based on their efficiency and accuracy. Different trackers have varying performance under different scenarios. For example, CSRT tracker is most accurate among these trackers, but is also most time consuming. MedianFlow tracker is fast and accurate when an object move slowly in the video, yet have poor performance for a fast moving object. We use the implementation from OpenCV for all trackers.

Downsampling Ratio for the Tracker (ds). The ds controls the input image size to the tracker. The value of ds is limited to 1, 2, and 4, i.e., no downsampling, downsampling by a factor of 2 and 4, respectively. A larger ds reduces the computational cost, and favors the tracking of fast moving objects. A smaller ds increase the latency, yet provide more accurate tracking of slowly moving objects.

Content Feature Extraction

To start with, content features have great impact on both the accuracy and latency of each AB based on the following observations—(1) tracker latency is affected by the number and area of the objects because tracker algorithms take the bounding boxes of the detection frames as inputs and calculate features inside each box; (2) both detection and tracker accuracy are affected by the content in the video. For example, detection DNNs perform consistently poorly with small objects on MS COCO dataset, including Faster-RCNN, SSD, and YOLO. Moreover, both detection DNN and tracker find it harder to deal with fast-moving objects. Some previous works mention that movement between frames can be used as a feature to trigger the heavy detection process. This implies that for video object detection systems, we need to extract these content features to improve the accuracy and latency of our models. The following discussion considers two types of content features.

Object Basic Features. Object basic features may include a number of objects and the summed area of the objects. These features may be used for modeling the tracker latency. The intuition is that some light-weight trackers' latency increases proportionally with the number of objects and the area of the objects since each object is tracked independently, and the larger the area, the more tracking-related features need computation. In was empirically verified, through experimentation according to various examples, that the latency of the object trackers is affected by both the number and sizes of the objects. In some experimentation, 10% of the ImageNet video object detection (VID) training dataset was used to generate the latency data samples, though additional or fewer may be used in practice, depending on the implementation.

Object Movement Features. The recent movement of objects may be used as a feature for modeling the framework accuracy. The features may be express as a measurement of distance. More rigorously, the movement may be defined as the Euclidean distance of the objects' centers. In some examples, the content feature extractor may take the mean movement of all, or a large subset of, the objects in the recent frames. The intuition is that the faster the objects move in the video frame, the lower the accuracy, especially for the execution branches with higher sampling interval. Experimental results, according to various examples, show that the accuracy of high si branches (si=100) does not drop significantly ($\approx$10%) on slow moving videos but reduces (>30%) on fast moving videos.

Latency Modeling

The latency model may aim to predict the frame-wise latency of each AB for future frames. $L_{fr}$ may be denoted as the per-frame latency of our adaptive object detection framework. $L_{fr}$ is a function of the DNN based detection latency $L_{DNN}$ and the tracking latency $L_{tracker}$. If object detection DNN runs every si frames (sampling interval), the latency $L_{fr}$ is given by $$L_{fr} = \frac{L_{DNN}}{si} + L_{tracker},$$

The models of the detection latency $L_{DNN}$ and the tracking latency $L_{tracker}$ are respectively described below.

Latency Prediction for Object Detection DNN.

The latency of the object detection DNN ($L_{DNN}$) is jointly determined by the at least two configuration parameters for the multi-branch detector—the input image size shape and the number of proposals nprop. Moreover, considering the input shape of frames may vary in different videos, we add the height and width of the input image as additional features. These features could be ignored if the video source is a video camera (which outputs fixed sized frames). Besides the input shape of video frames, system contention (CPU/GPU usage and memory bandwidth, as detailed below) will also affect the DNN latency. Thus, the latency equation of the DNN is given by $$L_{DNN} = f_{DNN}(nprop, shape, height, width, contention)$$

We fit a quadratic regression model for $f_{DNN}$ to characterize the latency of the detection DNN. Once trained, the regression model is evaluated on a subset of the test set (sparsely sampled), where the mean squared error (MSE) between the prediction $\hat{L}_{DNN}$ and the ground-truth $L_{DNN}$ latency are reported.

Latency Prediction for Object Trackers

The number of objects and average sizes of objects play a major role for the tracking latency. A model $f_{tracker}$ may characterize the latency of the object tracker under the system contention. Similar to the detection latency model, we also add the height and width of the input image as additional features. Thus, $f_{tracker}$ is given by:

$$L_{tracker} = f_{tracker}(\text{height}, \text{width}, n\_obj, avg\_size, \text{contention})$$

We fit quadratic regression models to the ground-truth $L_{tracker}$. Moreover, since the model depends on n_obj and avg_size of the previous frame, we use the previous frame's n_obj and avg_size to train $L_{tracker}$. After the training process, we compute the predicted $\hat{L}_{Tracker}$ and measure the MSE across a subset of the test set.

Accuracy Modeling

Accuracy prediction models aim to predict the expectation of the accuracy of each AB for near future frames. The accuracy of an object detector is usually defined by the metric mean average precision (mAP). However, predicting the absolute mAPs given a test video is difficult. To address this issue, the absolute mAP metric may be converted into a relative percentage metric. More precisely, a base branch is identified in the detection framework using the detection-only branch (si=1) with nprop=100 and shape=576. This base branch sets the performance upperbound for all approximation branches (62.3% mAP on the validation set). The mAP of each AB is normalized to its percentage value by dividing its mAP by the base branch's mAP.

Different from the latency models, the factors on the accuracy are coupled all together (i.e., no distinction between detection DNN and tracking). Thus, a single unified model may be given by:

$$A = f_A(\text{si}, \text{shape}, \text{nprop}, \text{tracker}, \text{ds}, \text{movement})$$

where tracker is the tracker type, ds is the downsampling ratio of the input to the tracker, and movement is the object movement features extracted from the video content. A decision tree model $f_A$ was learned to predict the accuracy A, trained with the MSE loss across the whole training dataset.

Synthetic Contention Generator

A synthetic contention generator was a tool developed to study the adaptive object detection framework according to various examples and embodiments described herein. The synthetic contention generator tests how well the adaptive object detection framework can adapt to varying resource contention on the same device on which it is running. It is used to derive experimental results in Xu et al., ApproxDet: Content and Contention-Aware Approximate Object Detection for Mobiles, ACM-SenSys, (2020).

Synthetic Contention Generator (CG) is designed as a stand-in for any resource contention on the device. A detection framework may suffer from unpredictable levels of resource contention when it is running on mobile platforms due to the instantiation of other co-located applications, for which we will not have information. At least three important types of resources are available on mobile platforms—CPU, memory bandwidth (MB), and GPU. CPU may be controlled contention by the number of CPU cores our CG occupies. We control MB contention by the amount of memory-to-cache bandwidth that it consumes. The code is modified from the widely used STREAM benchmark that is meant to measure the MB capacity of a chip. For the GPU contention, we control the number of GPU cores that are utilized. The three-dimensional CG is orthogonal, which means we can tune each dimension without affecting the other dimensions. The CG is representative because we executed and mapped the contention caused by some widely used applications in the 3D contention space (Table 2). The first one is an anomaly detection program that uses Robust Random Cut Forest (RRCF) to detect anomalies from a local temperature and humidity sensor data. We also used our two object detection DNNs, namely Faster R-CNN and YOLOv3, for checking how much contention they can generate.

TABLE 2

Applications running in the 3D contention space

| Real Apps | CPU | MB (MB/s) | GPU |
|---|---|---|---|
| Anomaly detention | 99.80% | 500 | 0% |
| Faster R-CNN | 69.75% | 1000 | 99% |
| YOLOv3 | 65.85% | 800 | 98.50% |

Profiling Cost and Sub-Sampling

The cost of collecting ground truth data with design features for performance prediction models is significant without proper sampling techniques. We measure our profiling cost for the accuracy, detection latency, and tracker latency models in Table 3.

TABLE 3

Cost of profiling.

| Task | Cost |
|---|---|
| Framework accuracy | 2,414 hr · core (20% of the configurations) |
| Detection latency | 7 hr · machine w/15 out 1 million sampling |
| Tracker latency | 1 hr · machine w/169 out 1 million sampling |

To efficiently collect the profiling data, we use the master and worker model, where the master node manages a list of configurations of the detection framework and distributes the profiling work, while workers run the particular configuration to collect the training data for the modeling. As the feature space is huge, we sparsely sample the multi-dimensional space of ("number of proposals", "resized shape", "sampling interval", "tracker", "down-sampling ratio of the tracker"). We finally use 20% of the configurations to train our accuracy model.

Similar sub-subsampling techniques are used for the latency models as well, and we sample data points on videos of various height and width, various numbers of objects and object sizes, under discrete 3D contention levels. During experimentation, 15 out of a million feature points were used to train our detection latency model and 169 out of a million feature points to train our tracker latency model.

Figure 3:
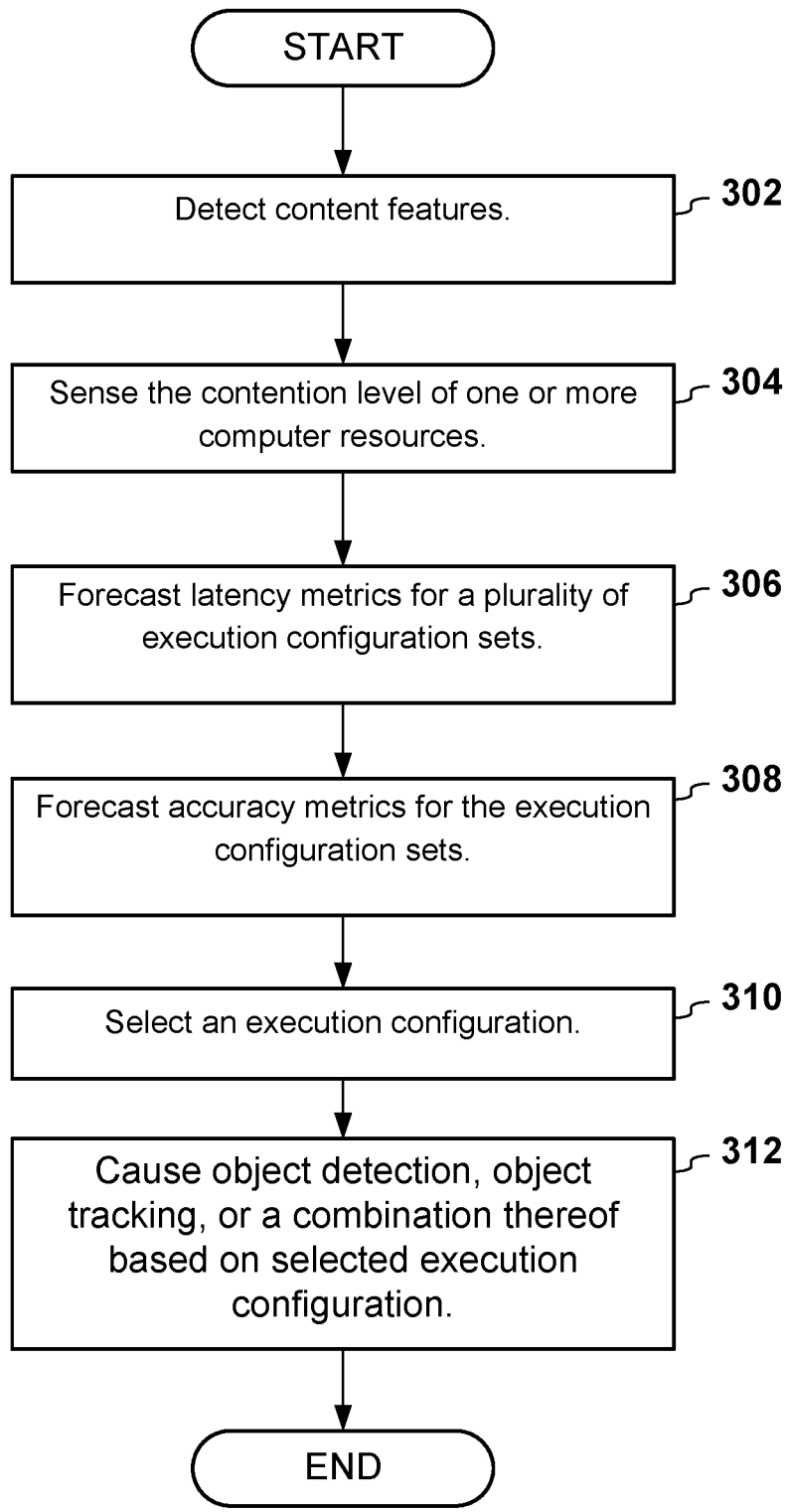
FIG. 3 illustrates an example of logic for a scheduler of a multi-branch object detector.

FIG. 3 illustrates example logic for the scheduler 104. The content feature extractor 114 may detect object in the video information (302). For example, the content feature extractor 114 may manage/generate the content features of the video by extracting height, width from current frame, memorizing n_obj, avg_size of last frame and movement from past frames. It is lightweight in terms of the compute load it puts on the target platform and this is desirable since we have to extract the features at runtime on the target board for feeding into our models.

The contention sensor 116 may sense the contention level of one or more computer resources (304). Contention level is a measure of resource competition on the device between the adaptive object detection framework (or a subcomponent thereof) and background concurrent applications. The higher the contention level, the more the adaptive object detection framework is affected by the concurrent application due to less resource allocated to object tracking object detection, etc.

There are various manners in which the contention level may be generated. In an example the contention level may be a measure of CPU, GPU, Memory, or other computer resource utilization which is not idle and not dedicated to the adaptive object detection framework. Alternatively or in addition, the contention level may be a ratio or percentage of computer resource utilization between the adaptive object detection framework and other non-idle tasks, application, processes, etc.

In various experimentation CPU contention, CPU contention level was an integer between 0 and 6 representing the number of cores that the synthetic contention generator (CG) occupies. For memory bandwidth contention, the scale was integer between 0 to 40000 with a unit of MB/s that represents the memory bandwidth that the synthetic CG occupies. For GPU contention, the scale was floating point number between 0 and 1 which represents the percentage of GPU cores that the synthetic CG takes.

The contention sensor 116 may capture utilization metric of a computer resource, or group of computer resource. The computer resource may induce a hardware and/or virtual resource. For example, the resource may include a measure of memory usage, CPU usage, disk storage usage, or combination thereof. The metric may be expressed as a percentage, a capacitance (i.e. # of bytes), a latency (i.e. milliseconds or the like). Alternatively, or in addition, the computer resource may include a software-based resource and the utilization metric may include a measure of operation or execution, such as number of threads, processes, or other parameters made available through an operating system to measure operating system performance and/or execution.

Although one can theoretically get the ground truth of the resource contention by probing the system and directly measuring CPU, memory bandwidth and GPU usage by other processes, it is not practical. As a normal application in the user space, it is difficult to collect the exact resource information from other processes. The hardware is also lacking sufficient support for such fine-grained measurement on mobile or embedded devices. In contrast, the offline latency log under various contention levels and the online latency log of the current branch in the past few runs are a natural observation of the contention level. Thus, we proposed the log-based contention sensor.

In some examples, the contention sensor 116 may be a log-based contention sensor. The log-based contention sensor may find a contention level where the offline latency log matches the averaged online latency most closely. We use the nearest-neighbor principle to search for such contention levels in our pre-defined orthogonal 3D contention space.

Contention space is the search space of all possible contention levels. To estimate the current contention level, the contention sensor observes the current averaged online latency of the adaptive object detection framework (or sub-components thereof, such as the multi-branch detector). It then checks the offline latency log and estimates the contention level as the one under which the observed online latency is closest to the offline latency.

As multiple contention levels may cause the same impact on the latency of a given AB, we call it a cluster of contention levels and we pick one level out of it as the representative. In comparison to some previous work in the systems community, the contention sensor described herein is lightweight, efficient, and does not require additional privileges at system level, making it a more practical offering in real-world systems.

The scheduler may forecast latency metrics for execution configuration sets (306). The latency metric may measure the end-to-end latency of the object detection for detecting the objects in a video frame and averaged across all the frames of the video, which essentially maps to the entire length of the video. Typically, this will be in milliseconds for latency-sensitive applications, and more specifically in the realm of 33 msec to 50 msec to support 20-30 frames/sec. Alternatively or in addition, the latency metric may be expressed as a percentile, such as a p50, p75, p99 etc.

Each execution configuration set may include a unique combination of tuning parameters and cause the multi-branch object detector to perform a different AB. The scheduler may access the latency model and determine the latency measurement based on content features extracted from video information and contention level obtained from the contention sensor.

The scheduler may forecast accuracy metrics for the execution configuration sets (308). The scheduler may access the accuracy model and generate the accuracy metrics based on the content features. The accuracy metric may measure the mean average precision (mAP) of the bounding box placement relative to the ground truth bounding boxes and typically an IoU (intersection-over-union of the output bounding box versus the ground truth bounding box) value of 50% or higher is considered accurate enough. For mAP, the average IoU of all the bounding boxes across all the video frames is averaged by the total number of bounding boxes. The exact mAP computation may vary somewhat from protocol to protocol but the output will typically be a percentage and the higher the percentage the better. The best algorithms will output an mAP of 95% and higher for example. The mAP will drop for more challenging videos and for more stringent latency SLA (service level agreements), where a more stringent latency SLA will mean some sacrifice of the accuracy metric such as by approximating aggressively.

The scheduler may select an execution configuration from the domain of execution configuration 310. The accuracy and latency metrics associated with the selected execution configuration may satisfy a performance criterion provided to the scheduler. For example, the scholar may receive, via user input or some other source, the performance criterion. The performance criterion may have a rule that compares the accuracy and/or latency metrics to predefined threshold values or evaluates the metrics under predefined logic to provide an indication of acceptance, such as a Boolean value or the like. If the criterion is satisfied, then the execution configuration is selected for the multi-branch object detector.

The schedule may cause object detection, object tracking, or a combination thereof based on the selected execution configuration (312). For example, the scheduler may communicate the execution configuration and/or video information to the multi-branch object detector 102 for processing.

Figure 4:
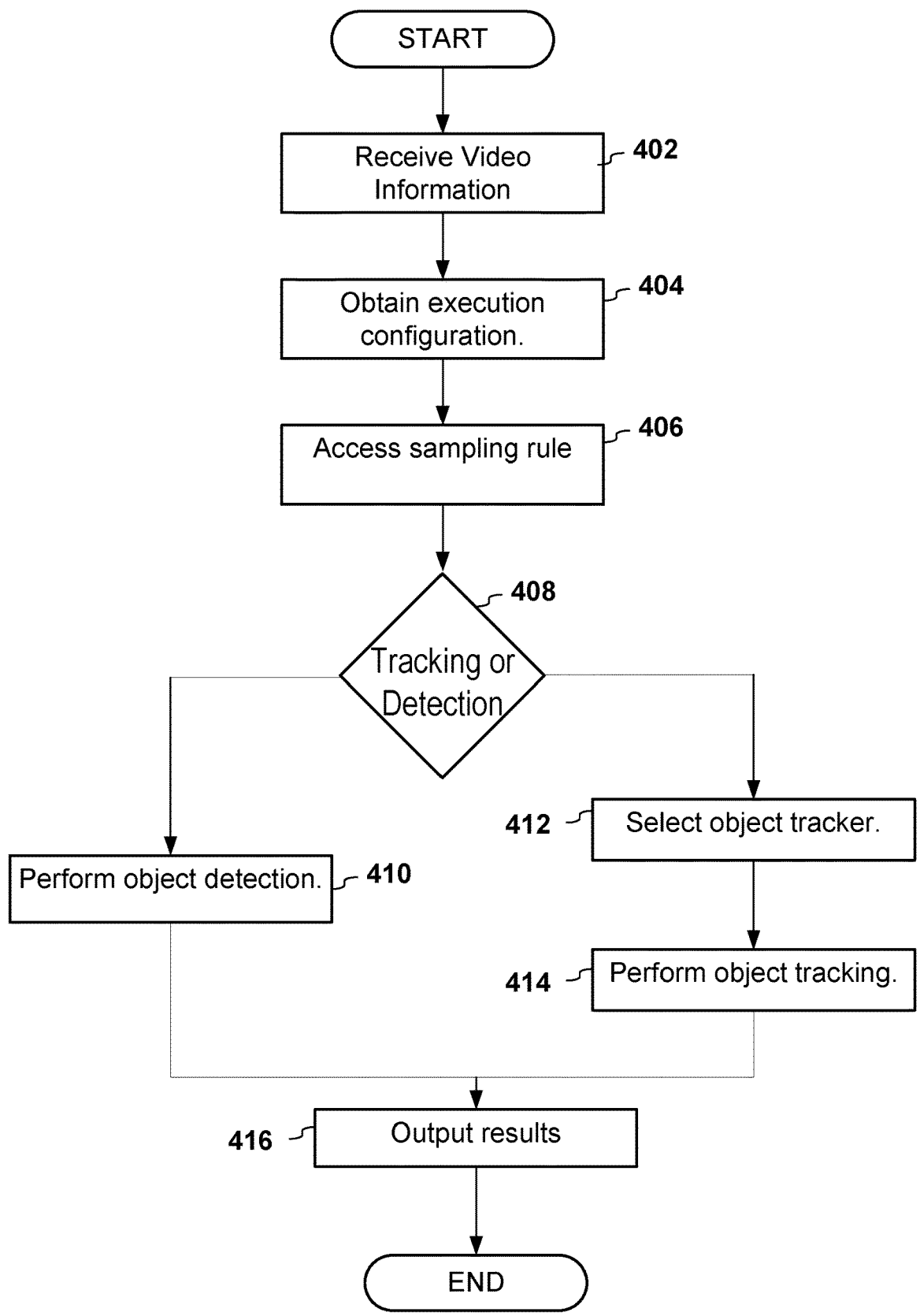
FIG. 4 illustrates an example of logic for a multi-branch object detector.

FIG. 4 illustrates example logic for the multi-branch object detector 102. The multibranch object detector may receive video information (402). The video information may include, among other information, a video frame or multiple frames. The multi-branch object detector may obtain an execution configuration (404). For example, the execution configuration may be received from the scheduler.

The multi-branch object detector 102 may receive a sampling rule. The sampling rule may include or evaluate the sampling interval previously described, or any other information indicative of a rule for switching between detection and tracking and the object tracker. In some examples, the execution configuration may include a sampling rule.

The multi-branch object detector 102 may select object detection or object tracking depending on the sampling rule (408). In response to selection of object detection, the multi-branch object detector 102 may perform object detection utilizing the detection DNN and the configuration parameters included in the execution configuration (410). In response to selection of object tracking, the multi-branch object tracker may select an object tracker (412). For example, the execution confirmation may specify the object tracker to select. The multi-branch object detector may perform object tracking according to the parameters in the execution configuration (414).

After the completion of the object tracking and/or object detection, the multi-branch object detector may output the results (416). The results may include the output of the object detector and/or the object tracker. For example, the results my include coordinates of bounding box(es), an object identification in bounding box(es), class probabilities of the objects contained in the bounding boxes, or a combination thereof.

The steps illustrated in the flow logic herein may include additional, different, or fewer operations than illustrated in FIG. 3 and FIG. 4. The steps may be executed in a different order than illustrated. Moreover, the system may be implemented with additional, different, or fewer components than illustrated in FIG. 1 and FIG. 2. Each component may include additional, different, or fewer components.

Figure 5:
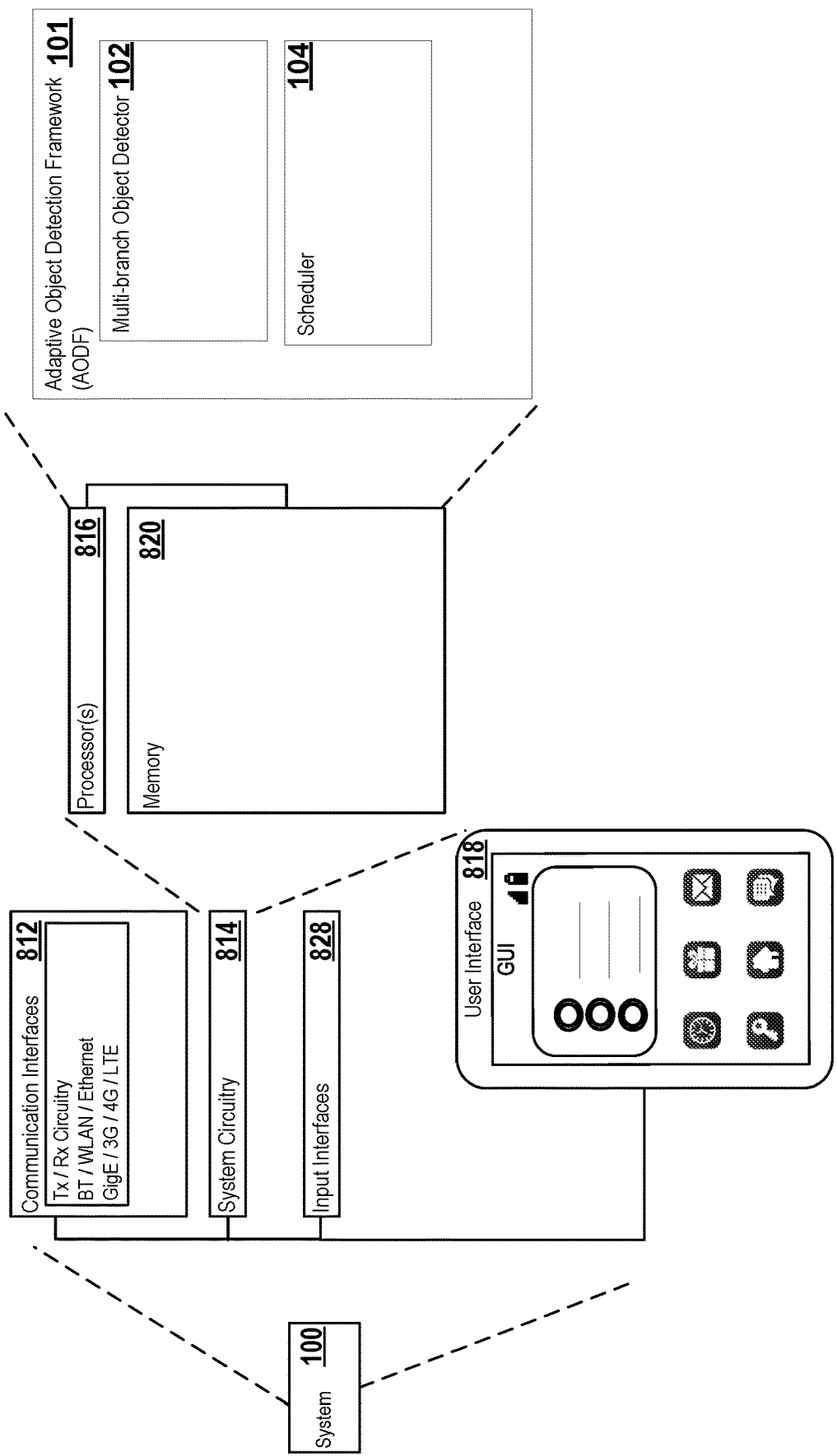
FIG. 5 illustrates a second example of a system.

FIG. 5 illustrates a second example of the system 100. The system 100 may include communication interfaces 812, input interfaces 828 and/or system circuitry 814. The system circuitry 814 may include a processor 816 or multiple processors. Alternatively, or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations the adaptive object detection framework 101, the multi-branch object detector 102, scheduler 104, and/or the system 100. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include at least one of the adaptive object detection framework 101, the multi-branch object detector 102, scheduler 104. Alternatively or in addition, the memory may include any other component or sub-component of the system 100 described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 100 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 100 may be implemented in many different ways. In some examples, the system 100 may be implemented with one or more logical components. For example, the logical components of the system 100 may be hardware or a combination of hardware and software. The logical components may include the adaptive object detection framework 101, the multi-branch object detector 102, the scheduler, and/or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks and flash memory drives. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method, comprising
receiving video information
performing object detection and object tracking based on an execution configuration;
approximating an optimized execution configuration based on computer resource contention and content in of the video information by:
 identifying, based on the video information, a plurality of content features;
 measuring a contention level of a computer resource;
 forecasting, based on the content features and the measured contention level, latency metrics for performing object detection and object tracking using each of a plurality of execution configuration sets, respectively;
 forecasting, based on the content features, accuracy metrics for performing object detection and tracking using each of the execution configuration sets, respectively; and
 selecting, from the execution configuration sets, an optimized execution configuration set corresponding to one of the latency metrics and one of the accuracy metrics, in response to a combination of the one of the accuracy metrics and the one of the latency metrics satisfying a performance criterion; and
performing object detection and object tracking based on the optimized execution configuration.

2. The method of claim 1, wherein the optimized execution configuration comprises a sampling rule, wherein performing object detection and object tracking based on the optimized execution configuration further comprises:
executing either object detection or object tracking based on a sampling rule.

3. The method of claim 2, wherein the sampling rule includes a sampling interval which specifies how often to perform object detection, object tracking, or a combination thereof.

4. The method of claim 1, wherein the optimized execution configuration comprises an input shape and a number of proposals, wherein performing object detection and object tracking based on the optimized execution configuration further comprises:
accessing an input shape and a number of proposals from the optimized configuration set;
providing the input shape, the number of proposals, and the video information to a deep neural network; and
determining an object classification based on output of the neural network.

5. The method of claim 1, wherein the optimized execution configuration comprises a tracker type parameter, wherein performing object detection and object tracking based on the optimized execution configuration further comprises:
accessing the tracker type parameter from the optimized execution configuration;
selecting, from a plurality of available object trackers, a second object tracker corresponding to the tracker type; and
performing object tracking with the second object tracker.

6. The method of claim 1, wherein the optimized execution configuration comprises a down-sampling parameter, wherein performing object detection and object tracking based on the optimized execution configuration further comprises:
accessing the down-sampling ratio parameter from the selected execution configuration set; and
down-sampling the video information based on the down-sampling ratio.

7. The method of claim 1, wherein forecasting, based on the content features and the measured contention level, latency metrics for a plurality of execution configuration sets further comprises:
providing the content features and the contention level to a machine learning model trained based on training information comprising execution configuration sets, historical content features, historical contention levels, and historical latency metrics.

8. The method of claim 1, wherein forecasting, based on the content features, accuracy metrics for the execution configuration sets, respectively, further comprises:
providing the content features to a machine learning model trained based on training information comprising historical content features and historical latency metrics.

9. The method of claim 1, wherein to obtaining the contention level further comprises
measuring usage of a physical or virtualized hardware on which is accessed by performance of the object detection and object tracking.

10. A system comprising a processor, the processor configured to:
receive video information
perform object detection and object tracking based on an execution configuration;
approximate an optimized execution configuration based on computer resource contention and content in of the video information, wherein to approximate the optimized execution configuration, the processor is configured to:
identify, based on the video information, a plurality of content features;
measure a contention level of a computer resource,
approximate, based on the content features and the contention level, latency metrics for performing object detection and object tracking using each of a plurality of execution configuration sets, respectively,
approximate, based on the content features, accuracy metrics for performing object detection and tracking using each of the execution configuration sets, respectively, and
select the optimized execution configuration set from the execution configuration sets in response to a combination of one of the accuracy metrics and one of the latency metrics satisfying a performance criterion; and
perform object detection and object tracking based on the optimized execution configuration set.

11. The system of claim 10, wherein the optimized execution configuration comprises a sampling rule, wherein to perform object detection and object tracking based on the optimized execution configuration, the processor is further configured to:
execute either object detection or object tracking based on a sampling rule.

12. The system of claim 11, wherein the sampling rule includes a sampling interval which specifies how often to perform object detection, object tracking, or a combination thereof.

13. The system of claim 10, wherein the optimized execution configuration comprises an input shape and a number of proposals, wherein to perform object detection and object tracking based on the optimized execution configuration, the processor is further configured to:
access an input shape and a number of proposals from the optimized configuration set;
provide the input shape, the number of proposals, and the video information to a deep neural network; and
determine an object classification based on output of the neural network.

14. The system of claim 10, wherein the optimized execution configuration comprises a tracker type parameter, wherein to perform object detection and object tracking based on the optimized execution configuration, the processor is further configured to:
access the tracker type parameter from the optimized execution configuration;
select, from a plurality of available object trackers, a second object tracker corresponding to the tracker type; and
perform object tracking with the second object tracker.

15. The system of claim 10, wherein the optimized execution configuration comprises a down-sampling parameter, wherein to perform object detection and object tracking based on the optimized execution configuration, the processor is further configured to:
access the down-sampling ratio parameter from the selected execution configuration set; and
down-sample the video information based on the down-sampling ratio.

16. The system of claim 10, wherein to approximate, based on the content features and the measured contention level, latency metrics for a plurality of execution configuration sets, the processor is further configured to:
provide the content features and the measured contention level to a machine learning model trained based on training information comprising execution configuration sets, historical content features, historical contention levels, and historical latency metrics.

17. The system of claim 10, wherein to approximate, based on the content features, accuracy metrics for the execution configuration sets, respectively, the processor is further configured to:
provide the content features to a machine learning model trained based on training information comprising historical content features and historical latency metrics.

18. The system of claim 1, wherein to obtain a contention level, the processor is further configured to:
measure usage of a physical or virtualized hardware on which is accessed by performance of the object detection and object tracking.

* * * * *